J. R. DUNHAM.
LAWN ROLLER.
APPLICATION FILED APR. 20, 1914.

1,174,698.

Patented Mar. 7, 1916.

Witnesses:
Herman Eiserl
D. Pindling.

Inventor:
John R. Dunham,
by ⎯⎯ Merkel,
his Attorney.

THE COLUMBIA PLANOGRAPH CO., WASHINGTON, D. C.

UNITED STATES PATENT OFFICE.

JOHN R. DUNHAM, OF BEREA, OHIO, ASSIGNOR TO THE DUNHAM COMPANY, OF BEREA, OHIO, A CORPORATION OF OHIO.

LAWN-ROLLER.

1,174,698.   Specification of Letters Patent.   Patented Mar. 7, 1916.

Application filed April 20, 1914. Serial No. 833,287.

*To all whom it may concern:*

Be it known that I, JOHN R. DUNHAM, a citizen of the United States, resident of Berea, county of Cuyahoga, and State of Ohio, have invented a new and useful Improvement in Lawn-Rollers, of which the following is a specification, the principle of the invention being herein explained and the best mode in which I have contemplated applying that principle, so as to distinguish it from other inventions.

My invention relates to lawn-rollers, its object being to provide a lawn-roller which will be economical of construction and efficient in its operation and use.

Said invention consists of means hereinafter fully described and particularly set forth in the claim.

The annexed drawing and the following description set forth in detail certain means embodying my invention, the disclosed means, however, constituting but one of various mechanical forms in which the principle of the invention may be applied.

Figure 1:
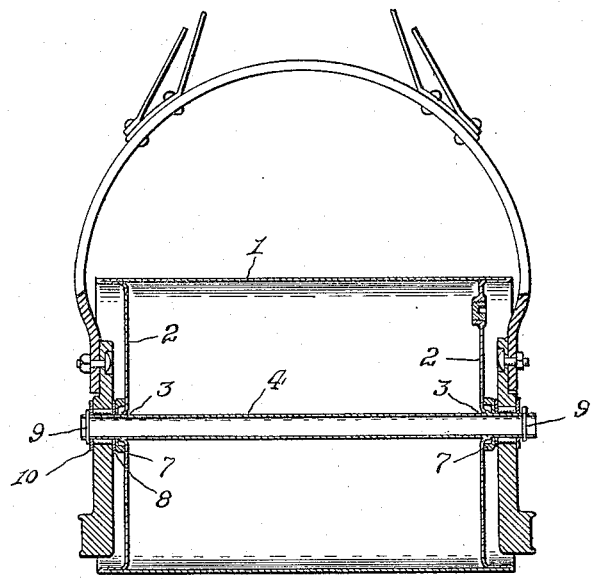
Figure 2:
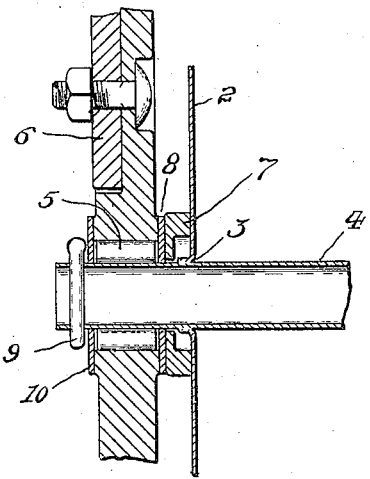
Figure 3:
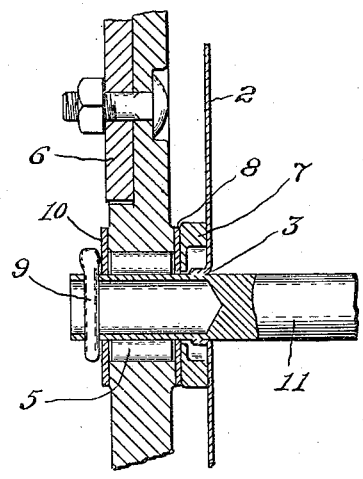

In said annexed drawing:—Figure 1 represents a vertical section of a lawn-roller embodying my invention. Fig. 2 represents a vertical, axial, fragmentary section, upon an enlarged scale, of that part of the roller which embodies my invention. Fig. 3 represents a view similar to that of Fig. 2 and showing a modified form of my invention.

The illustrated embodiment of my invention comprises a drum 1, having end heads 2, 2, each provided with a central opening 3.

Referring first to the structure illustrated by Fig. 2, an axle tube 4 extends through the openings 3 and outwardly beyond same a sufficient distance to form journals for the roller bearings 5 of the handle 6, the two ends extending outwardly a sufficient distance to permit of the interposition of a cup-shaped washer 7 and an ordinary disk washer 8 between the head 2 to the adjacent handle-portion, as shown in Fig. 2. The washer 7 is made such that its inner surface will engage the head 2 while the outside of the washer is out of contact with the joint made between the metal surrounding the opening 3 and the tube. This joint is preferably made by welding in any suitable and approved manner.

The outwardly projecting ends of the axle tube are also made of sufficient length to permit same to extend beyond the bearings and permit the use of a cotter pin 9, passing through the outer end portion, and a washer 10 held in place thereby, said washer retaining the rollers of the bearing 5 laterally in place, as will be readily understood.

In the modified form shown in Fig. 3, a solid bar 11 is substituted for the tubular axle 4, the ends of the bar being made tubular a distance such that the heads 2 may be welded to a tubular part of such bar, as shown in Fig. 3, it having been found necessary, in order to effect a welded union, to have the reduction of the mass of metal afforded by the tubular form of the bar at the place of juncture.

Having fully described my invention, what I claim and desire to secure by Letters Patent is:—

In a lawn roller, the combination of a drum provided with end heads each having a central opening; a tubular axle secured in said openings and extending outwardly through same; a handle mounted upon said outwardly extending axle portions; anti-friction bearings interposed between said handle and said axle portions, whereby the latter form journals for said bearings; a spacing washer surrounding each of said extending axle portions; a holding washer interposed intermediately of said spacing washer and handle; and a second and outer retaining washer suitably secured in place and adapted to hold said anti-friction bearings in place on their journals.

Signed by me, this 16th day of April, 1914.

JOHN R. DUNHAM.

Attested by—
 I. E. FURRY,
 A. F. EHRBAR.

Copies of this patent may be obtained for five cents each, by addressing the "Commissioner of Patents, Washington, D. C."